(12) United States Patent
Hirai (10) Patent No.: US 9,948,879 B2
(45) Date of Patent: Apr. 17, 2018

(54) IMAGE PROCESSING APPARATUS, IMAGE PROCESSING METHOD, AND IMAGE CAPTURING APPARATUS

(71) Applicant: CANON KABUSHIKI KAISHA, Tokyo (JP)

(72) Inventor: Yuichi Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/153,939

(22) Filed: May 13, 2016

(65) Prior Publication Data
US 2016/0344962 A1 Nov. 24, 2016

(30) Foreign Application Priority Data

May 21, 2015 (JP) ................................. 2015-104003

(51) Int. Cl.
*H04N 5/378* (2011.01)
*H04N 5/3745* (2011.01)

(52) U.S. Cl.
CPC ......... *H04N 5/378* (2013.01); *H04N 5/37457* (2013.01)

(58) Field of Classification Search
CPC ........................... H04N 5/378; H04N 5/37467
USPC .................. 348/241, 243, 345, 349
See application file for complete search history.

(56) References Cited

U.S. PATENT DOCUMENTS

| | | | |
|---|---|---|---|
| 6,115,148 A | 9/2000 | Imai et al. | |
| 6,791,607 B1* | 9/2004 | Bilhan | H04N 5/18 348/243 |
| 6,900,837 B2* | 5/2005 | Muramatsu | H04N 5/374 348/243 |
| 9,204,030 B2 | 12/2015 | Okita | |
| 2008/0054320 A1* | 3/2008 | Solhusvik | H04N 5/3575 257/292 |
| 2008/0170086 A1* | 7/2008 | Hatani | H04N 5/361 345/690 |
| 2009/0040328 A1* | 2/2009 | Suzuki | H04N 5/361 348/222.1 |
| 2009/0180014 A1* | 7/2009 | Noda | H04N 5/3452 348/308 |
| 2010/0085458 A1* | 4/2010 | Horiguchi | H04N 5/378 348/308 |

(Continued)

FOREIGN PATENT DOCUMENTS

| | | |
|---|---|---|
| JP | 2001-083407 A | 3/2001 |
| JP | 2013-068759 A | 4/2013 |

*Primary Examiner* — Tuan Ho
*Assistant Examiner* — Marly Camargo
(74) *Attorney, Agent, or Firm* — Fitzpatrick, Cella, Harper & Scinto (57) ABSTRACT

An image processing apparatus for processing signals read out from an image sensor that includes a plurality of photoelectric conversion portions for each of a plurality of micro-lenses, and can read out signals for each row selectively by either an addition readout operation, or a divisional readout operation. The image processing apparatus includes a first processing unit to perform offset correction on signals of a first row read out by the addition readout operation using signals in two or more rows that were read out by the addition readout operation before the first row, and a second processing unit to perform offset correction on signals of a second row read out by the divisional readout operation using the signals of the second row and a predetermined value.

14 Claims, 9 Drawing Sheets

(56) References Cited

U.S. PATENT DOCUMENTS

| | | | |
|---|---|---|---|
| 2011/0025871 A1* | 2/2011 | Yoshioka | H04N 5/35581 348/222.1 |
| 2011/0317705 A1* | 12/2011 | Takeda | H04N 5/361 348/308 |
| 2013/0021497 A1* | 1/2013 | Kawamura | H04N 5/361 348/231.3 |
| 2015/0062394 A1* | 3/2015 | Ikeda | H04N 5/347 348/301 |

* cited by examiner

☐ ADDITION READOUT
▨ DIVISIONAL READOUT

IMAGE PROCESSING APPARATUS, IMAGE PROCESSING METHOD, AND IMAGE CAPTURING APPARATUS

CLAIM OF PRIORITY

This application claims the benefit of Japanese Patent Application No. 2015-104003, filed May 21, 2015, which is hereby incorporated by reference herein in its entirety.

BACKGROUND OF THE INVENTION

Field of the Invention

The present invention relates to an image processing apparatus, an image processing method, and an image capturing apparatus, and more specifically, it relates to an image processing apparatus, an image processing method, and an image capturing apparatus for performing image signal noise correction.

Description of the Related Art

Conventionally, in phase-difference focus detection, the focus state of an imaging optical system has been detected by detecting the phase difference of a pair of images that have parallax and are formed by luminous flux that has passed through mutually different areas of an exit pupil of the imaging optical system. In recent years, image capturing apparatuses have been suggested that have an image sensor for acquiring a recording image in which at least a portion of the pixels of the image sensor are formed with pixels that can receive luminous flux that has passed through mutually different exit pupil areas and output images that have parallax. In such image capturing apparatuses, focusing processing is then performed based on the phase difference between the images that were obtained (hereafter, referred to as "on-imaging surface phase difference AF").

As an image capturing apparatus capable of performing on-imaging surface phase difference AF, Japanese Patent Laid-Open No. 2001-083407 suggests an imaging capturing apparatus that includes an image sensor capable of acquiring parallax images from the entire area of the image sensor. Moreover, in Japanese Patent Laid-Open No. 2013-068759, an image sensor in which pixels having two photoelectric conversion portions for one micro-lens are arranged over the entire surface thereof is suggested. In order to detect a phase difference, a readout operation needs to be performed so as to obtain at least two signals having a parallax from a pixel having a plurality of photoelectric conversion portions. However, the readout operation for obtaining two signals takes twice as long as a time for an addition readout operation in which signals of a plurality of photoelectric conversion portions are added for each pixel and are then read out, and, therefore, phase difference detection is time-consuming. In view of this, Japanese Patent Laid-Open No. 2013-068759 discloses that an operation of independently reading out a signal from each of two photoelectric conversion portions of a pixel, and an operation of adding the signals for each pixel and reading out the added signal are switched in units of frames at a predetermined cycle. On-imaging surface phase difference AF can be then performed by performing focusing processing using the independently read out signals. Accordingly, the focusing processing can be realized while suppressing the increase in signal readout time in on-imaging surface phase difference AF.

Meanwhile, conventionally, image quality deterioration factors that are other than the information obtained by photoelectric conversion is superimposed onto a captured recording image that is obtained from an image sensor. Among those factors, the influence of horizontal band noise caused by noise being superimposed on a vertical output line when reading out signals from a pixel is known. As correction processing for reducing this horizontal band noise, there is a method of detecting the deviation between a representative value (e.g., an average value) in a light-shielded portion of a row to be corrected, and the average value of the representative values of light-shielded portions of a plurality of rows immediately before that row (average value in the vertical direction), and performing clamp processing using the detected deviation as a correction value.

However, when reading out signals for one frame using the image sensor described in Japanese Patent Laid-Open No. 2013-068759, in a case when independent readout and addition readout were performed selectively in units of rows, horizontal band noise correction was not performed appropriately, in some cases.

SUMMARY OF THE INVENTION

The present invention has been made in consideration of the above situation, and reduces the influence caused by the reading method in correction processing on signals for one frame that were obtained by selectively driving an image sensor by a divisional readout method or an addition readout method in units of rows.

According to the present invention, provided is an image processing apparatus for processing signals read out from an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the image processing apparatus comprising a first processing unit configured to perform offset correction on signals of a first row read out by the first reading method, using signals in a predetermined number of rows that were read out by the first reading method before the first row, the predetermined number being two or more, and a second processing unit configured to perform offset correction on signals of a second row read out by the second reading method, using the signals of the second row and a predetermined value.

Further, according to the present invention, provided is an image capturing apparatus comprising an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, a first processing unit configured to perform offset correction on signals of a first row read out from the image sensor by the first reading method, using signals in a predetermined number of rows that were read out by the first reading method before the first row, the predetermined number being two or more, and a second processing unit configured to perform offset correction on signals of a second row read out from the image sensor by the second reading method, using the signals of the second row and a predetermined value.

Furthermore, according to the present invention, provided is an image processing method of processing signals read out from an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the image processing method comprising performing offset correction on signals of a first row read out by the first reading method, using signals in a predetermined number of rows that were read out by the first reading method before the first row, the predetermined number being two or more, and performing offset correction on signals of a second row read out by the second reading method, using the signals of the second row and a predetermined value.

Further, according to the present invention, provided is a computer-readable storage medium that stores a program for causing a computer to function as units of an image processing apparatus having an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the medium storing a first program code that causes the computer to perform offset correction on signals of a first row read out from the image sensor by the first reading method, using signals in a predetermined number of rows that were read out by the first reading method before the first row, the predetermined number being two or more, and a second program code that causes the computer to perform offset correction on signals of a second row read out from the image sensor by the second reading method, using the signals of the second row and a predetermined value.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Configuration of Image Sensor

Figure 1:
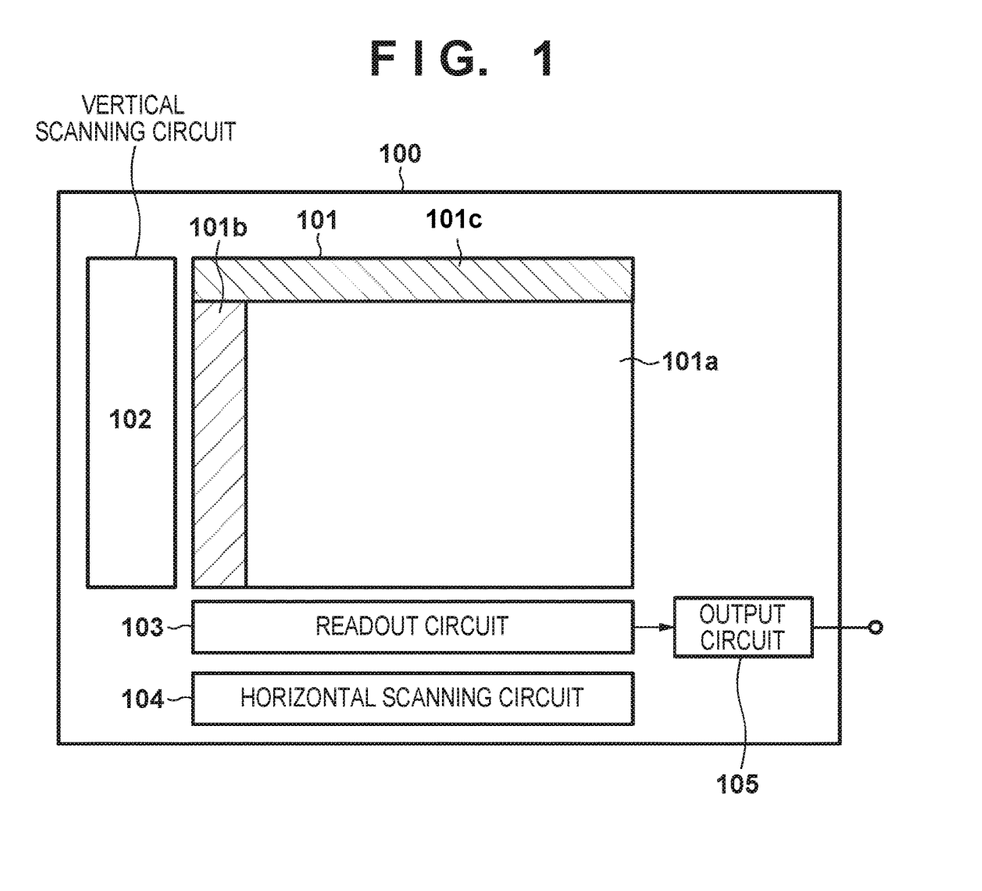
FIG. 1 is a diagram showing a schematic configuration of an image sensor according to an embodiment of the present invention.

FIG. 1 is a diagram showing the schematic configuration of an image sensor 100 according to this embodiment. As shown in FIG. 1, the image sensor 100 includes a pixel part 101 in which a plurality of pixels are arranged two-dimensionally, a vertical scanning circuit 102, a readout circuit 103, a horizontal scanning circuit 104, and an output circuit 105. The pixel part 101 includes an effective area 101a for receiving incident light and performing photoelectric conversion, a vertical optical black (OB) area 101b that is optically shielded from light, and a horizontal optical black (OB) area 101c that is optically shielded from light.

The vertical scanning circuit 102 selects and controls a pixel row in the pixel part 101. The readout circuit 103 reads out signals output from the pixels in a row selected by the vertical scanning circuit 102, and transfers the read signals to the output circuit 105 in accordance with control of the horizontal scanning circuit 104, and the signals are sent out of the image sensor 100 by the output circuit 105.

Figure 2A:
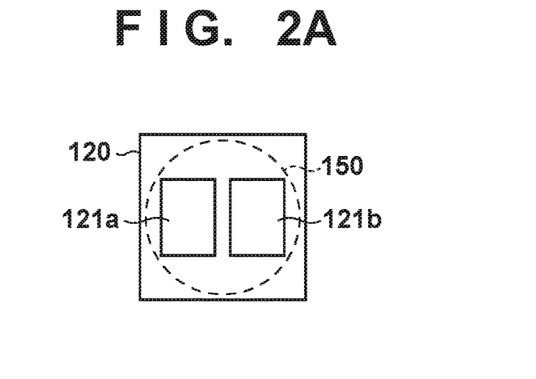
FIGS. 2A and 2B are diagrams showing a configuration example of the image sensor according to the embodiment.

FIG. 2A is a plan view of a pixel 120 constituting the pixel part 101. As shown in FIG. 2A, the pixel 120 includes one micro-lens 150, and two photoelectric conversion portions (PD) 121a and 121b constituted by photodiodes, or the like. Note that FIG. 2A shows an example in which the pixel is constituted by two photoelectric conversion portions, but there is no limitation on the configuration of the pixel, and it is sufficient that the pixel is constituted by a plurality of photoelectric conversion portions capable of outputting signals having parallax, and a pixel with three or more photoelectric conversion portions may be used.

Figure 2B:
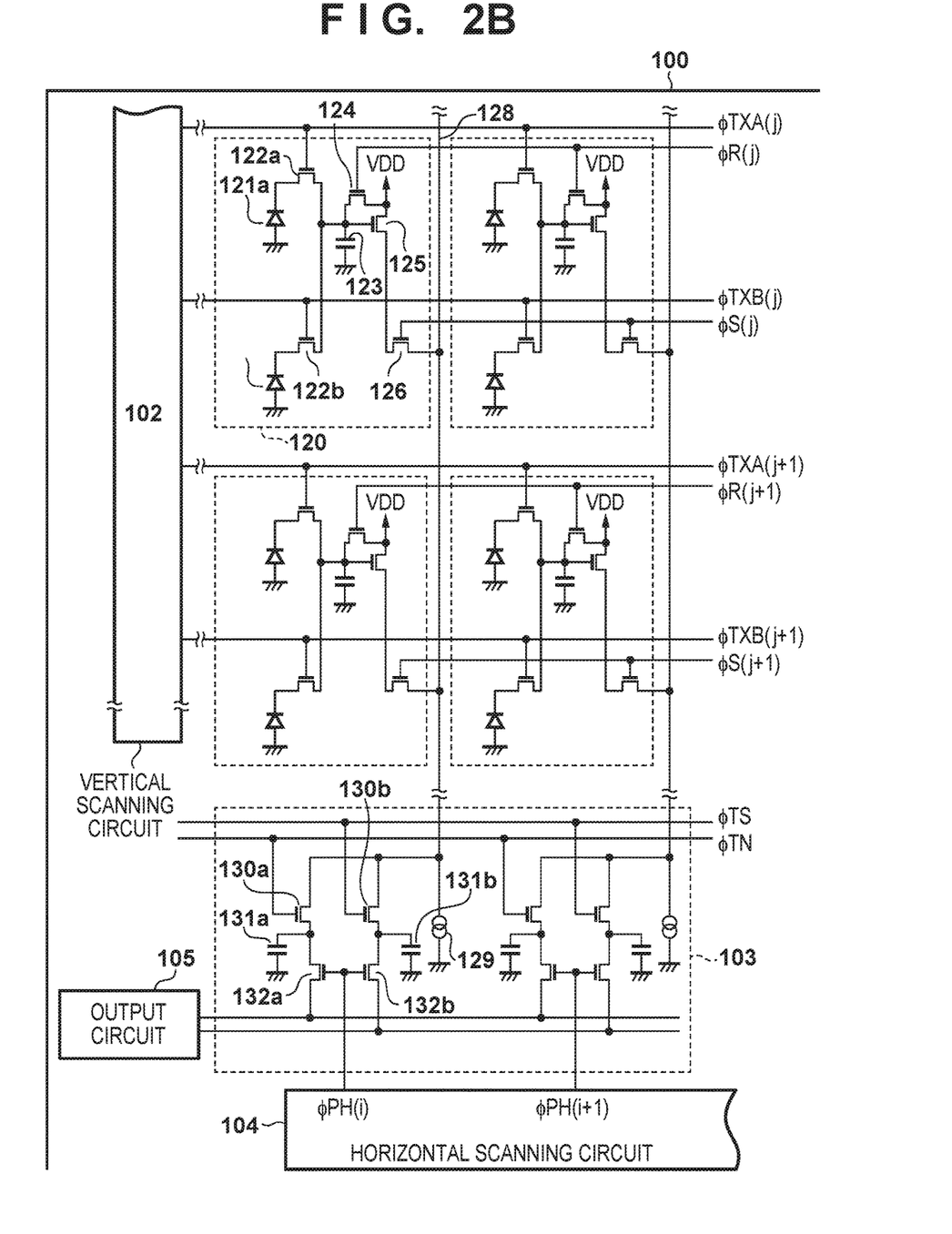

FIG. 2B is an equivalent circuit diagram showing, out of the pixels that constitute the pixel part 101 and are arranged two-dimensionally, pixels for two rows (a j-th row and a (j+1)th row) and two columns (an i-th column and an (i+1)th column), and the configuration of the readout circuit 103 for the two columns (the i-th column and the (i+1)th column). The pixel 120 is provided with the PDs 121a and 121b, transfer switches 122a and 122b, a floating diffusion (FD) area 123, a reset switch 124, a source follower amplifier 125, and a row selection switch 126.

A control signal φTXA(j) is input to the gate of the transfer switch 122a of the pixels 120 in the j-th row, and a control signal φTXB(j) is input to the gate of the transfer switch 122*b* of the pixels 120 in the j-th row. The reset switch 124 is controlled by a reset signal φR(j). In addition, a row selection signal φS(j) is input to the gate of the row selection switch 126. Note that the control signals φTXA(j) and φTXB(j), the reset signal φR(j), and the row selection signal φS(j) are controlled by the vertical scanning circuit 102. Similarly, the pixels 120 in the (j+1)th row are controlled by control signals φTXA(j+1) and φTXB(j+1), a reset signal φR(j+1), and a row selection signal φS(j+1).

Moreover, a vertical signal line 128 is provided for each pixel column, and each of the vertical signal lines 128 is connected to a current source 129 and transfer switches 130*a* and 130*b*, provided for each column, of the readout circuit 103.

A control signal φTN is input to the gate of the transfer switch 130*a*, and a control signal φTS is input to the gate of the transfer switch 130*b*. Moreover, a control signal φPH output from the horizontal scanning circuit 104 is input to the gates of a transfer switch 132*a* and a transfer switch 132*b*. A storage capacitance unit 131*a* stores the output of the vertical signal line 128 when the transfer switch 130*a* is in an on state and the transfer switch 132*a* is in an off state. Similarly, a storage capacitance unit 131*b* stores the output of the vertical signal line 128 when the transfer switch 130*b* is in an on state and the transfer switch 132*b* is in an off state.

By setting the transfer switch 132*a* and the transfer switch 132*b* in the i-th column to an on state using a column selection signal φPH(i) of the horizontal scanning circuit 104, the output of the storage capacitance unit 131*a* and the output of the storage capacitance unit 131*b* are transferred to the output circuit 105 via different horizontal output lines.

Readout Operation

An addition readout operation and a divisional readout operation can be selectively performed as a readout operation of reading out signals from the image sensor 100 having the above configuration. The addition readout operation and the divisional readout operation will be described below with reference to FIGS. 3 and 4.

Addition Readout Operation

Figure 3:
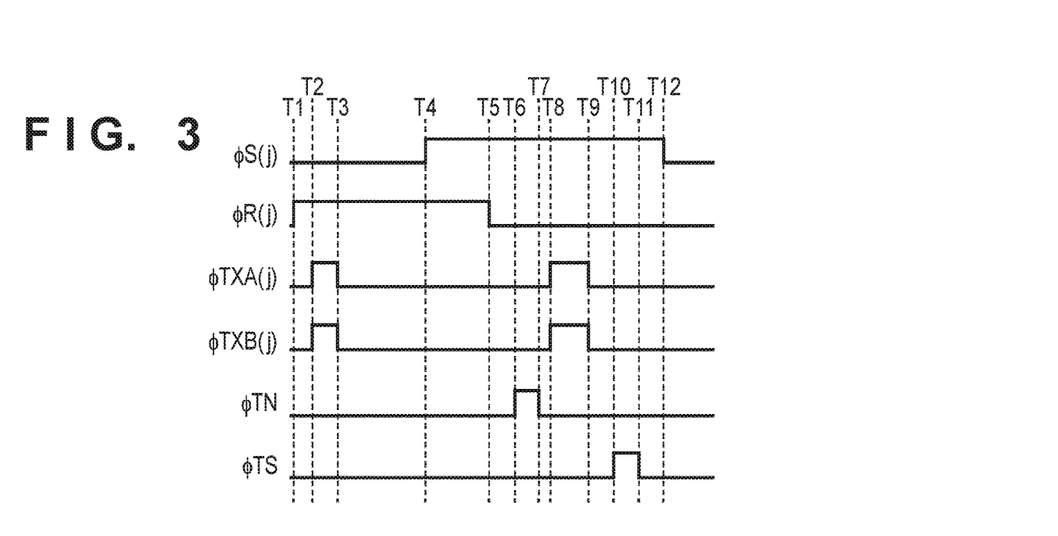
FIG. 3 is a timing diagram of an addition readout operation of the image sensor according to the embodiment.

FIG. 3 is a timing diagram for an addition readout operation of the image sensor 100. Note that, in this embodiment, a description will be given assuming that switches are turned on when the respective control signals are in an H (high) state, and are turned off when the control signals are in an L (low) state.

FIG. 3 shows the timing of an operation of reading out signals from the pixels in the j-th row of the image sensor 100 by the addition readout operation. At a time T1, the reset signal φR(j) rises to H. Next, when the control signals φTXA(j) and φTXB(j) rise to H at a time T2, the PDs 121*a* and 121*b* of the pixels 120 in the j-th row are reset.

Next, when the control signals φTXA(j) and φTXB(j) fall to L at a time T3, the PDs 121*a* and 121*b* start electrical charge accumulation. Subsequently, when the row selection signal φS(j) rises to H at a time T4, the row selection switch 126 is set to an on state, and is connected to the vertical signal line 128, thereby setting the source follower amplifier 125 to an activated state.

Next, when the reset signal φR(j) falls to L at a time T5, and the control signal φTN then rises to H at a time T6, the transfer switch 130*a* is set to an on state, and a signal on the vertical signal line 128 after releasing a reset (noise signal) is transferred to the storage capacitance unit 131*a*.

Next, after the control signal φTN falls to L at a time T7, and the noise signal is held in the storage capacitance unit 131*a*, when the control signals φTXA(j) and φTXB(j) rise to H at a time T8, the electrical charges of the PDs 121*a* and 121*b* are transferred to the FD area 123. At this time, the two electrical charges of the PDs 121*a* and 121*b* are transferred to the same FD area 123, and thus, a signal that is the addition of the electrical charges of the two PDs 121*a* and 121*b* (an optical signal for one pixel+a noise signal) is output to the vertical signal line 128.

Subsequently, after the control signals φTXA(j) and φTXB(j) fall to L at a time T9, when the control signal φTS rises to H at a time T10, the transfer switch 130*b* is set to an on state, and the signal (the optical signal for one pixel+the noise signal) on the vertical signal line 128 is transferred to the storage capacitance unit 131*b*.

Next, after the control signal φTS falls to L at a time T11, and the optical signal for one pixel+noise signal is held in the storage capacitance unit 131*b*, the row selection signal φS(j) falls to L at a time T12.

After that, the transfer switches 132*a* and 132*b* are set to H in order from the first pixel column to the last pixel column by the column selection signal φPH(i) of the horizontal scanning circuit 104. Accordingly, the noise signal and the optical signal for one pixel+noise signal of the storage capacitance units 131*a* and 131*b* are transferred to the output circuit 105 via different horizontal output lines. The output circuit 105 calculates the difference between the signals on these two horizontal output lines (the optical signal for one pixel), and outputs a signal obtained by multiplying the difference by a predetermined gain. Hereafter, the signal obtained by the above addition readout is referred to as a "first addition signal".

Divisional Readout Operation

Figure 4:
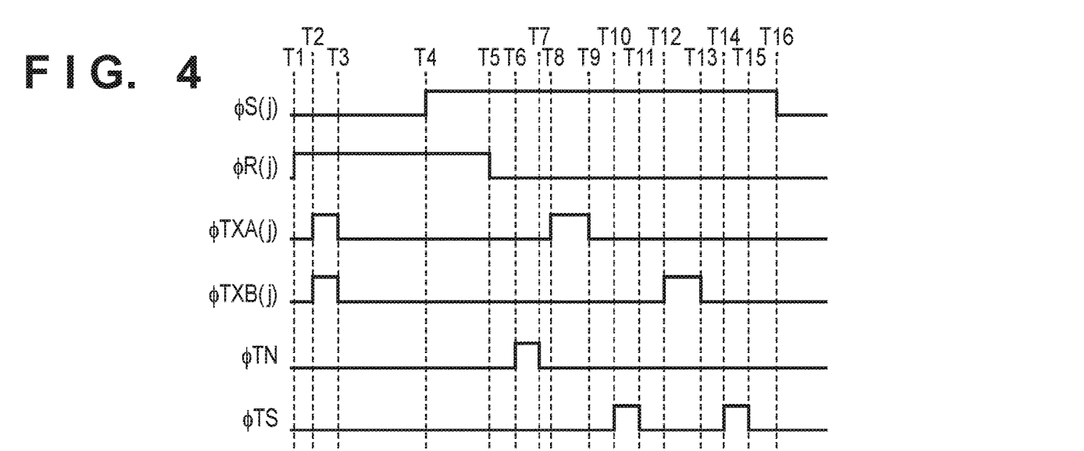
FIG. 4 is a timing diagram of a divisional readout operation of the image sensor according to the embodiment.

Next, a divisional readout operation will be described with reference to FIG. 4. FIG. 4 shows the timing of an operation of reading out signals from the pixels in the j-th row of the image sensor 100 by the divisional readout operation. At a time T1, the reset signal φR(j) rises to H. Subsequently, when φTXA(j) and φTXB(j) rise to H at a time T2, the PDs 121*a* and 121*b* of the pixels 120 in the j-th row are reset.

Next, when the control signals φTXA(j) and φTXB(j) fall to L at a time T3, the PDs 121*a* and 121*b* start electrical charge accumulation. Subsequently, when the row selection signal φS(j) rises to H at a time T4, the row selection switch 126 is set to an on state and is connected to the vertical signal line 128, setting the source follower amplifier 125 to an activated state.

When the reset signal φR(j) falls to L at a time T5, and the control signal φTN then rises to H at a time T6, the transfer switch 130*a* is set to an on state, and the signal on the vertical signal line 128 after releasing a reset (noise signal) is transferred to the storage capacitance unit 131*a*.

Next, after the control signal φTN falls to L at a time T7, and the noise signal is held in the storage capacitance unit 131*a*, when φTXA(j) rises to H at the time T8, the electrical charge of the PD 121*a* is transferred to the FD area 123. At this time, the electrical charge of one of the two PDs 121*a* and 121*b* (here, the PD 121*a*) is transferred to the FD area 123, and thus, only a signal that corresponds to the electrical charge of PD 121*a* is output to the vertical signal line 128.

Next, when the control signal φTXA(j) falls to L at a time T9, and the control signal φTS then rises to H at a time T10, the transfer switch 130*b* is set to an on state, the signal on the vertical signal line 128 (an optical signal for one PD+noise signal) is transferred to the storage capacitance unit 131*b*. Next, the control signal φTS falls to L at a time T11.

After this, the transfer switches 132a and 132b are set to H in order from the first pixel column to the last pixel column by the column selection signal φPH of the horizontal scanning circuit 104. Accordingly, the noise signal and the optical signal for one PD+noise signal of the storage capacitance units 131a and 131b are transferred to the output circuit 105 via different horizontal output lines. The output circuit 105 calculates the difference between the signals on these two horizontal output lines (the optical signal for one PD), and outputs a signal obtained by multiplying the difference by a predetermined gain. Hereafter, the signal obtained by the above readout is referred to as "divisional signal".

After that, the control signal φTXB(j) rises to H at a time T12, and the electrical charge of the PD 121b is further transferred to the FD area 123, in addition to the electrical charge of the PD 121a. At this time, the electrical charges of the two PDs 121a and 121b are transferred to the same FD area 123, and thus, a signal that is the addition of the electrical charges of the two PDs 121a and 121b (the optical signal for one pixel+the noise signal) is output to the vertical signal line 128.

Subsequently, after the control signal φTXB(j) falls to L at a time T13, when the control signal φTS rises to H at a time T14, the transfer switch 130b is set to an on state, and the signal (the optical signal for one pixel+the noise signal) on the vertical signal line 128 is transferred to the storage capacitance unit 131b.

Next, after the control signal φTS falls to L at a time T15, and the optical signal for one pixel+noise signal is held in the storage capacitance unit 131b, the row selection signal φS(j) falls to L at a time T16.

After this, the transfer switches 132a and 132b turn to H in order from the first pixel column to the last pixel column by the column selection signal φPH of the horizontal scanning circuit 104. Accordingly, the noise signal and the optical signal for one pixel+noise signal of the storage capacitance units 131a and 131b are transferred to the output circuit 105 via different horizontal output lines. The output circuit 105 calculates the difference between the signals on these two horizontal output lines (the optical signal for one pixel), and outputs a signal obtained by multiplying the difference by a predetermined gain. Hereafter, the signal obtained by the above readout is referred to as a "second addition signal" in order to distinguish it from the first addition signal.

By subtracting the divisional signal from the second addition signal that was read out in this manner, a divisional signal of the PD 121b can be obtained. A pair of divisional signals obtained in this manner are referred to as "focus detection signals". The phase difference between the signals can be then calculated by performing known correlation calculation on the obtained focus detection signals.

Note that the signals of the two PDs 121a and 121b may be independently read out in one electrical charge accumulation operation by reading out the signal of the PD 121b after reading out the signal of the PD 121a in the selected pixel row. The second addition signal can be obtained by adding the signals of the PDs 121a and 121b read out in two operations in this manner.

Control at Time of Frame Readout

Figure 5:
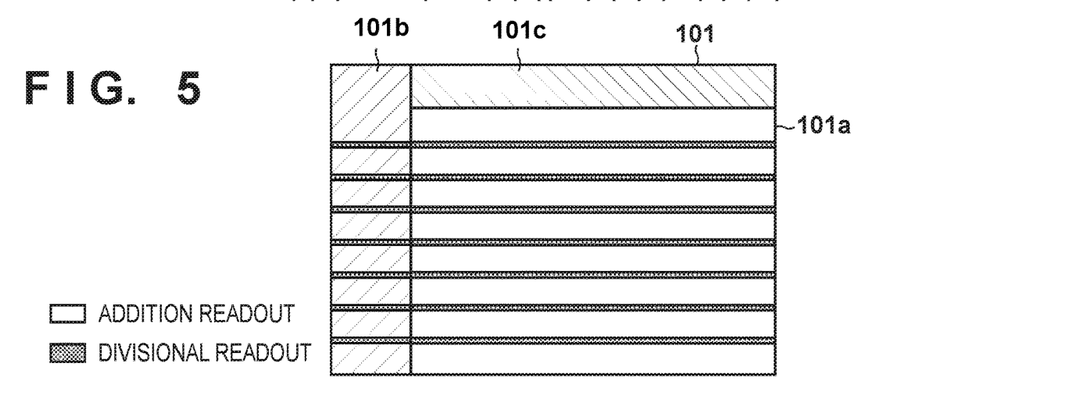
FIG. 5 is a diagram showing an example of selective driving control when reading out one frame according to the embodiment.

In this embodiment, selective driving control is performed as one type of readout control when reading out signals for one frame from the image sensor 100. In the selective driving control, at the time of reading out one frame, division readout is performed in predetermined rows so as to obtain focus detection signals and a second addition signal, and addition readout is performed in the other rows so as to acquire a first addition signal. FIG. 5 is a diagram showing the concept, and shows, as an example, a case in which division readout is performed for every predetermined number of rows. Focus detection by a phase difference method can be performed at any position in the frame by selectively performing division readout and addition readout in a frame in units of rows in this manner (selective phase difference AF). Moreover, compared with the case in which division readout is performed over the entire screen, the time required to read out signals can be shortened, and electrical power consumption can be suppressed. Furthermore, an image for one frame can be obtained from the first addition signal and the second addition signal.

Configuration of Image Processing Apparatus

Figure 6:
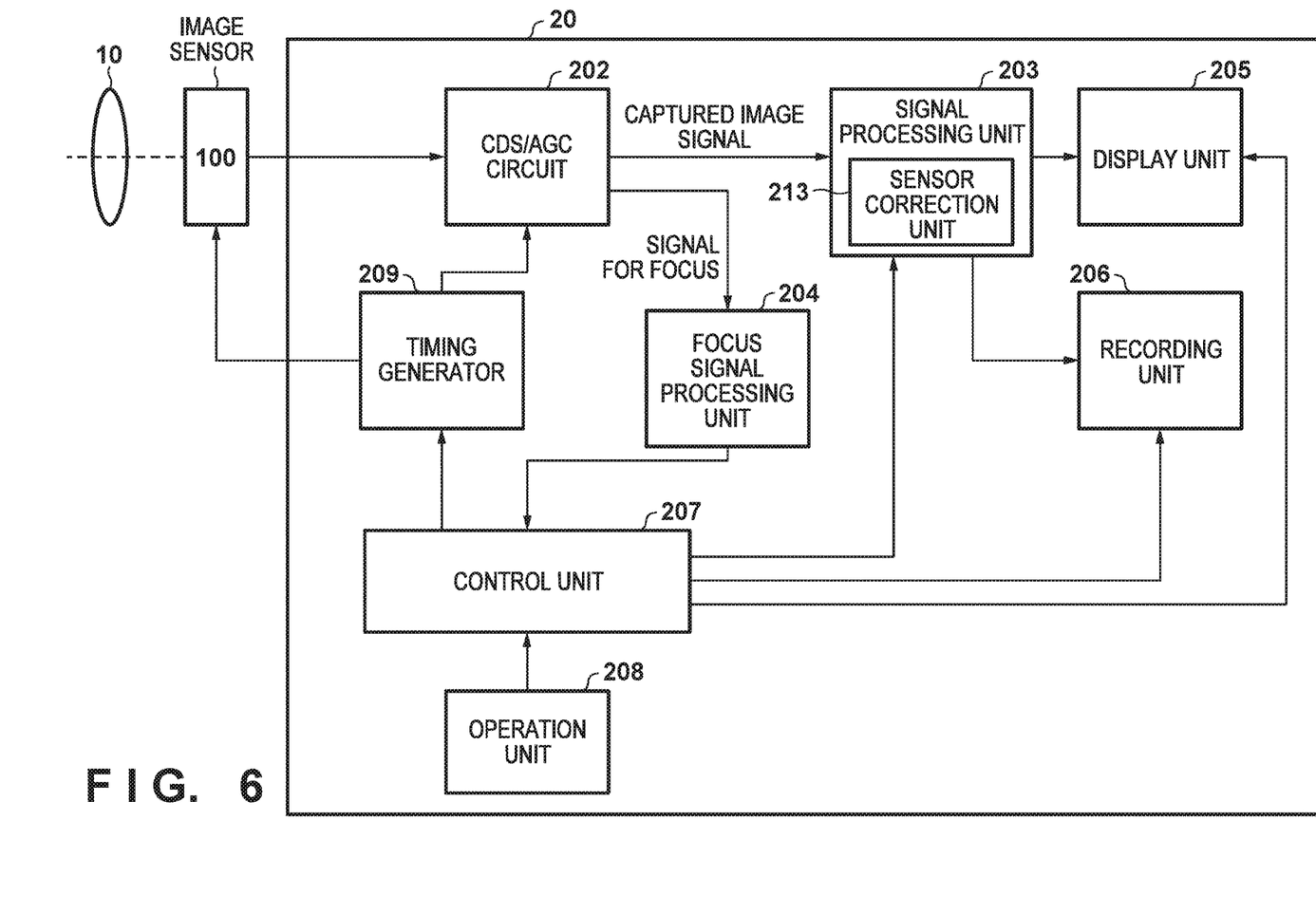
FIG. 6 is a block diagram showing a schematic configuration of an image processing apparatus according to the embodiment.

FIG. 6 is a block diagram showing the schematic configuration of an image processing apparatus 20 according to this embodiment for processing signals output from the image sensor 100 having the above configuration.

In the configuration shown in FIG. 6, luminous flux that entered via a lens unit 10 forms an image on the light receiving surface of the image sensor 100, and the formed object image is photoelectrically converted by the two PDs 121a and 121b of the pixels 120 of the image sensor 100 into electrical charges that are in accordance with an incident light amount, which are then accumulated. The electrical charges each accumulated in the PDs 121a and 121b are sequentially read out from the image sensor 100, based on drive pulses given from a timing generator 209 in accordance with an instruction of a control unit 207, as voltage signals that correspond to the electrical charges. The control unit 207 instructs the timing generator 209 to perform addition readout or to perform division readout for each row, as shown in FIG. 5, for example.

The signals read out from the image sensor 100 are input to a CDS/AGC circuit 202, and correlated double sampling for removing reset noise, gain adjustment, and signal digitization are performed. The CDS/AGC circuit 202 outputs the processed first and second addition signals to a signal processing unit 203 based on the drive pulse given from the timing generator 209, in accordance with an instruction of the control unit 207. In addition, the divisional signal and the second addition signal are output to a focus signal processing unit 204. Note that focus detection signals may be calculated from the divisional signal and the second addition signal in the CDS/AGC circuit 202, and the calculated focus detection signals may be output to the focus signal processing unit 204.

The signal processing unit 203 performs various types of image processing such as white balance correction, color level adjustment, suppression of false colors, high-frequency component processing, gamma correction, and shading correction on the first and second addition signals output from the CDS/AGC circuit 202, and generates image signals. The signal processing unit 203 also has a sensor correction unit 213, and, as one type of image processing, implements correction for removing the influence of image quality deterioration related to the configuration of the image sensor 100. For example, a sensitivity failure (pixel defect) of the PDs 121a and 121b, shot noise, and dark current superimposed on the PDs 121a and 121b, and the FD area 123, and variation in the characteristics of the column amplifier in the readout circuit 103, are corrected. Note that the configuration and processing of the sensor correction unit 213 will be described later in detail.

A display unit 205 is a display device such as an LCD, an organic EL, or the like, and displays an image based on image signals output from the signal processing unit 203. In addition, in a recording mode for recording image capturing signals, processed image signals are sent from the signal processing unit 203 to a recording unit 206, and are recorded in a recoding medium such as an optical disk, a semiconductor memory, or a magnetic tape.

The focus signal processing unit 204 performs known correlation calculation using a pair of focus detection signals output from the CDS/AGC circuit 202, calculates a defocus amount, and outputs the calculated defocus amount to the control unit 207. The control unit 207 performs focusing control for driving a focus lens included in the lens unit 10 to an in-focus position, based on the obtained defocus amount.

As described above, the control unit 207 controls whether to perform addition readout or division readout for each row, and controls the constituent elements in the image processing apparatus 20 by exchanging information with the respective constituent elements. Furthermore, the control unit 207 performs ON/OFF switching of the power supply, changing of the settings, recording, and switching of autofocus (AF)/manual focus (MF) control in accordance with input from the operation unit 208 operated by a user. The control unit 207 also performs various functions that are based on a user operation, such as recorded image confirmation and focus detection area selection.

Horizontal Band Correction

Figure 7:
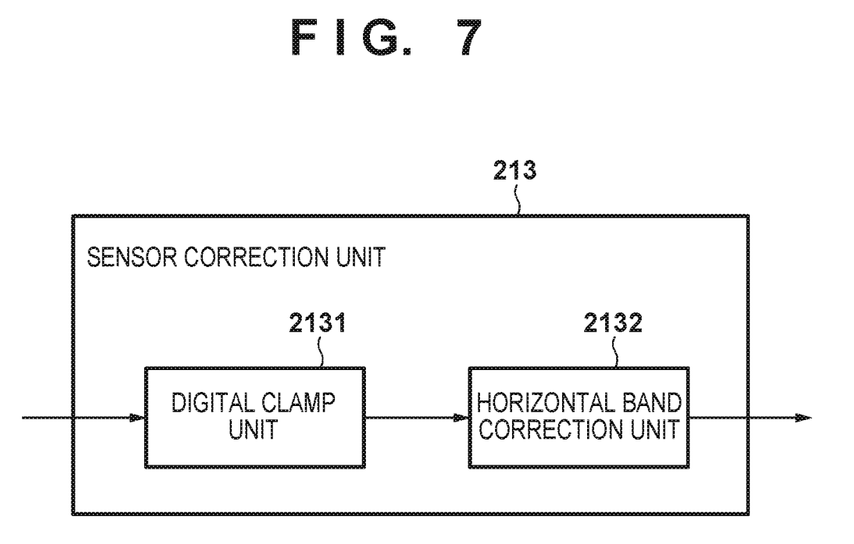
FIG. 7 is a block diagram showing a configuration of a sensor correction unit according to the embodiment.

FIG. 7 is a block diagram showing the configuration of the sensor correction unit 213 included in the signal processing unit 203. A digital clamp unit 2131 realizes clamping by subtracting the average value of the first addition signals obtained from the pixels 120 in the vertical OB area 101b that is constituted as a portion of the pixel part 101 from a value obtained from the first and second addition signals of the pixels in the effective area 101a.

A horizontal band correction unit 2132 corrects a horizontal band that occurs at any position in units of rows. Noise superimposed in units of rows and causing this horizontal band includes noise occurring by an offset level in the overall horizontal direction changing due to the influence of power supply noise, or the like, superimposed on the vertical signal line 128 shown in FIG. 6 while reading out signals. The horizontal band correction unit 2132 suppresses horizontal band noise by performing offset correction, which will be described later.

Next, horizontal band correction processing is performed by the horizontal band correction unit 2132 in this embodiment, and the detailed configuration of the horizontal band correction unit 2132 will be described with reference to FIGS. 8 to 12. First, an overview of horizontal band correction in this embodiment will be described with reference to FIGS. 9 and 10.

Figure 9:
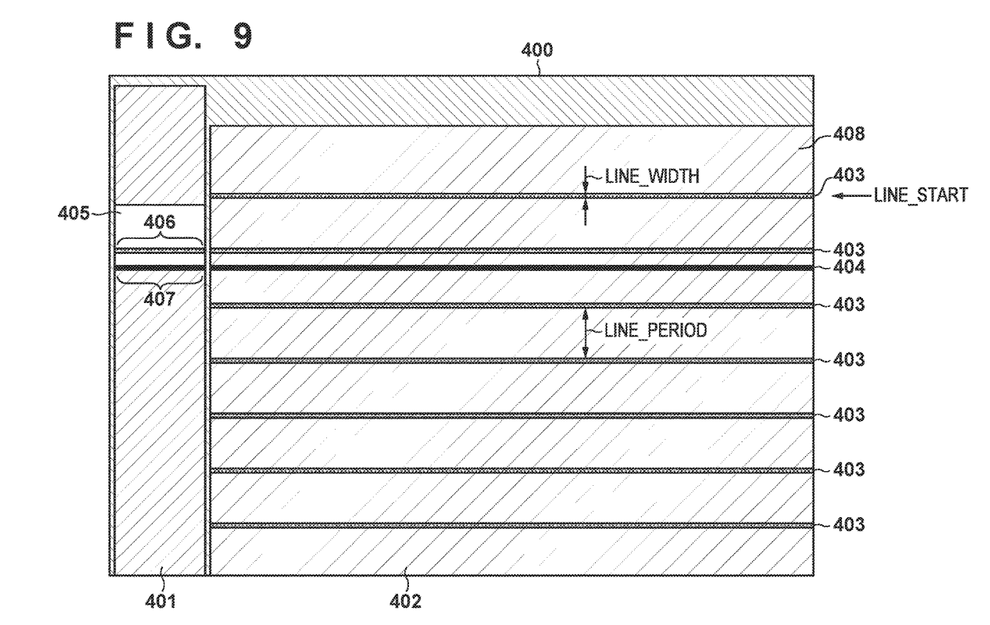
FIG. 9 is a conceptual diagram of a signal obtained by performing selective driving control according to the embodiment.

FIG. 9 is a conceptual diagram showing signals for one frame that were read out from the image sensor 100, and a processing frame 400 includes a detection area 401, a correction area 402, and divisional readout lines 403. The detection area 401 is an area of the pixels in a horizontal OB area 101c of the pixel part 101 shown in FIG. 1, and a determination of whether or not to perform horizontal band correction and generation of correction values are performed using signals that were read from the detection area 401. The correction area 402 is an area for implementing offset correction, and outputs signals read out from the pixels 120 in the effective area 101a in FIG. 1.

The divisional readout lines 403 are lines read out by performing division readout in the selective driving control as shown in FIG. 5. Note that, in the following description, a portion of the divisional readout lines 403 that is within the horizontal OB area 101c is referred to as division readout OB lines 406. Addition readout is performed on the lines other than the divisional readout lines 403.

A line of interest 404 indicates a line currently targeted for processing performed by the horizontal band correction unit 2132, and sequentially moves in units of rows in the correction area 402 from the top to the bottom of FIG. 9. Therefore, the line of interest 404 matches the divisional readout line 403, in some cases. Note that, in the following description, a portion of the line of interest 404 that is within the horizontal OB area 101c is referred to as an OB line of interest 407.

A smoothing area 405 indicates an area that is constituted by a plurality of rows immediately before the OB line of interest 407 in the detection area 401.

In a case when there is no line that underwent division readout, the horizontal band correction unit 2132 can perform horizontal band correction in the following manner. First, offset noise in the line of interest 404 in image data obtained by processing the first addition signals obtained from the image sensor 100 is detected by comparing the signal level of the OB line of interest 407 with the signal level of the smoothing area 405. A correction value is then generated in a case when offset noise is detected, and correction is performed on the signals of the line of interest 404 in the correction area 402.

To describe this in more detail, first, an integration value of the signal level of the OB line of interest 407 is normalized so as to obtain a representative value (Have value). Furthermore, a representative value is obtained for each of the other lines in the smoothing area 405 in a similar manner, the average value (Vave value) of the obtained representative values is obtained, and the magnitude of the representative value (Have value) of the OB line of interest 407 and the magnitude of the average value (Vave value) of the representative values of the smoothing area 405 are compared. In a case when the result is that |Vave−Have| is greater than a preset threshold value (REF_ER), it is determined that noise is superimposed on the line of interest 404, and the correction value is subtracted from the signal level of the line of interest 404 in the correction area 402. For example, a difference value obtained by Vave−Have can be used as the correction value. Note that the correction value is not limited thereto, and gain adjustment and offset adjustment may be performed in light of an input value in order to prevent excessive correction and erroneous correction.

However, in the case when the line of interest 404 matches the divisional readout line 403, or the smoothing area 405 includes the division readout OB line 406, the image quality actually deteriorates by performing the above-described horizontal band correction. The reason for this will be described with reference to FIG. 10.

Figure 10:
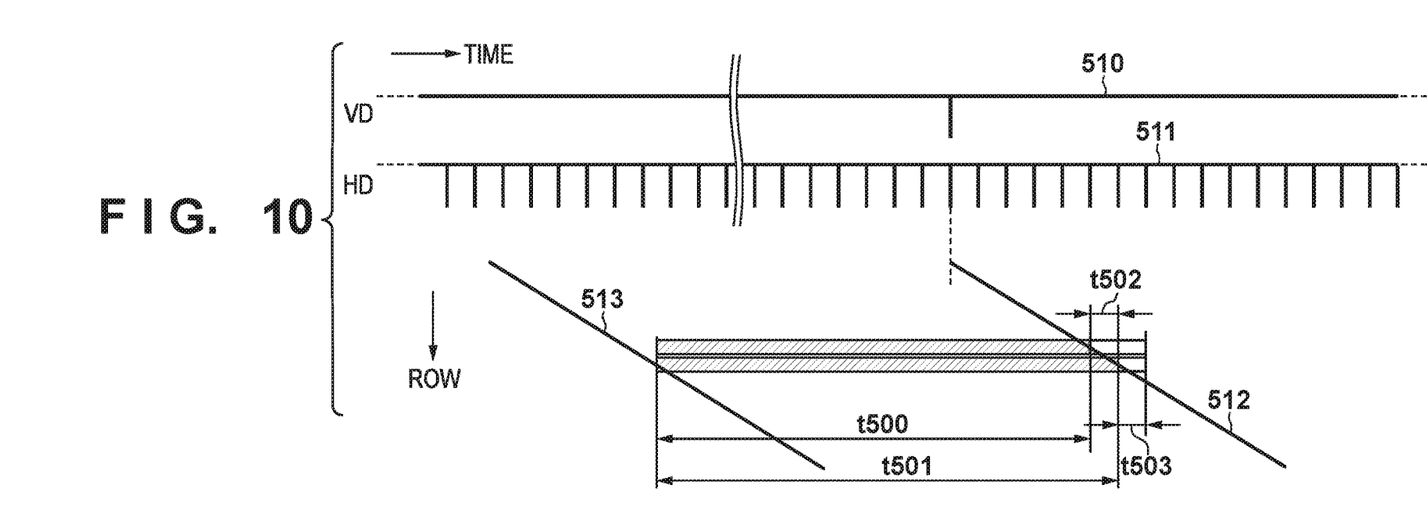
FIG. 10 is a diagram for describing an issue in the case of performing selective driving control.

FIG. 10 is a conceptual diagram showing electrical charge accumulation periods of the PDs 121a and 121b in a row in which division readout is performed in the case of performing rolling shutter scanning. At the top of FIG. 10, a vertical synchronization signal (VD) and a horizontal synchronization signal (HD) for driving the image sensor 100 are shown, and, at the bottom, a reset and readout timing and electrical charge accumulation periods for one row are shown. Note that the horizontal axis indicates time, and the vertical axis (shown at the bottom of the figure) indicates rows. Readout of frame data is started by the pulse of the vertical synchronization signal (VD), and readout of each piece of horizontal (line) data is performed by a respective pulse of the horizontal synchronization signal (HD) (512). In addition, reference number 513 indicates a reset timing for the electrical charge of each pixel in the image sensor 100.

A period t500 indicates the accumulation time of the PD 121a in a row in which division readout is performed, and a period t501 indicates the accumulation time of the PD 121b. A period t502 indicates the sum of the read out time and the transfer time of the PD 121a, and a period t503 indicates the sum of the read out time and the transfer time of PD 121b.

In a row in which addition readout is performed, the electrical charges of the PDs 121a and 121b are simultaneously transferred to the FD area 123 and are read out, and thus, the electrical charge accumulation times match (t500 or t501). On the other hand, in a row in which division readout is performed, the electrical charge accumulation time of the PD 121a is the period t500, and the electrical charge accumulation time of the PD 121b is the period t501 that lasts until the end of the PD 121a readout.

In other words, the electrical charge from the PD 121a is held in the FD area 123 for a longer time corresponding to the period t502 from when the electrical charge from the PD 121a is transferred to the floating diffusion (FD) area until when the electrical charge from the PD 121b is transferred to the FD area. Accordingly, there will be offset fluctuation factors due to FD leakage. Moreover, when transferring the electrical charge from the PD 121b to the FD area 123, the period from a reset to readout is extended, and the effect of CDS on noise of a constant current source on the vertical output line decreases. Therefore, an offset adverse effect is caused, and there will be an influence of image quality deterioration such as a horizontal band appearing on a recorded image.

Therefore, the horizontal band correction unit 2132 of this embodiment does not use the signal level from the division readout OB line 406 for processing in the case when the smoothing area 405 includes the division readout OB line 406. In addition, in the case when the line of interest 404 matches the divisional readout line 403, a representative value (Have value) of the OB line of interest 407 (namely, the division readout OB line 406) is acquired, and is compared with a preset black reference value (REF_BK). In the case when the difference between the representative value (Have value) and the black reference value (REF_BK) is greater than a threshold value (REF_ER_BK), measures are taken by performing offset correction on the difference value.

Figure 8:
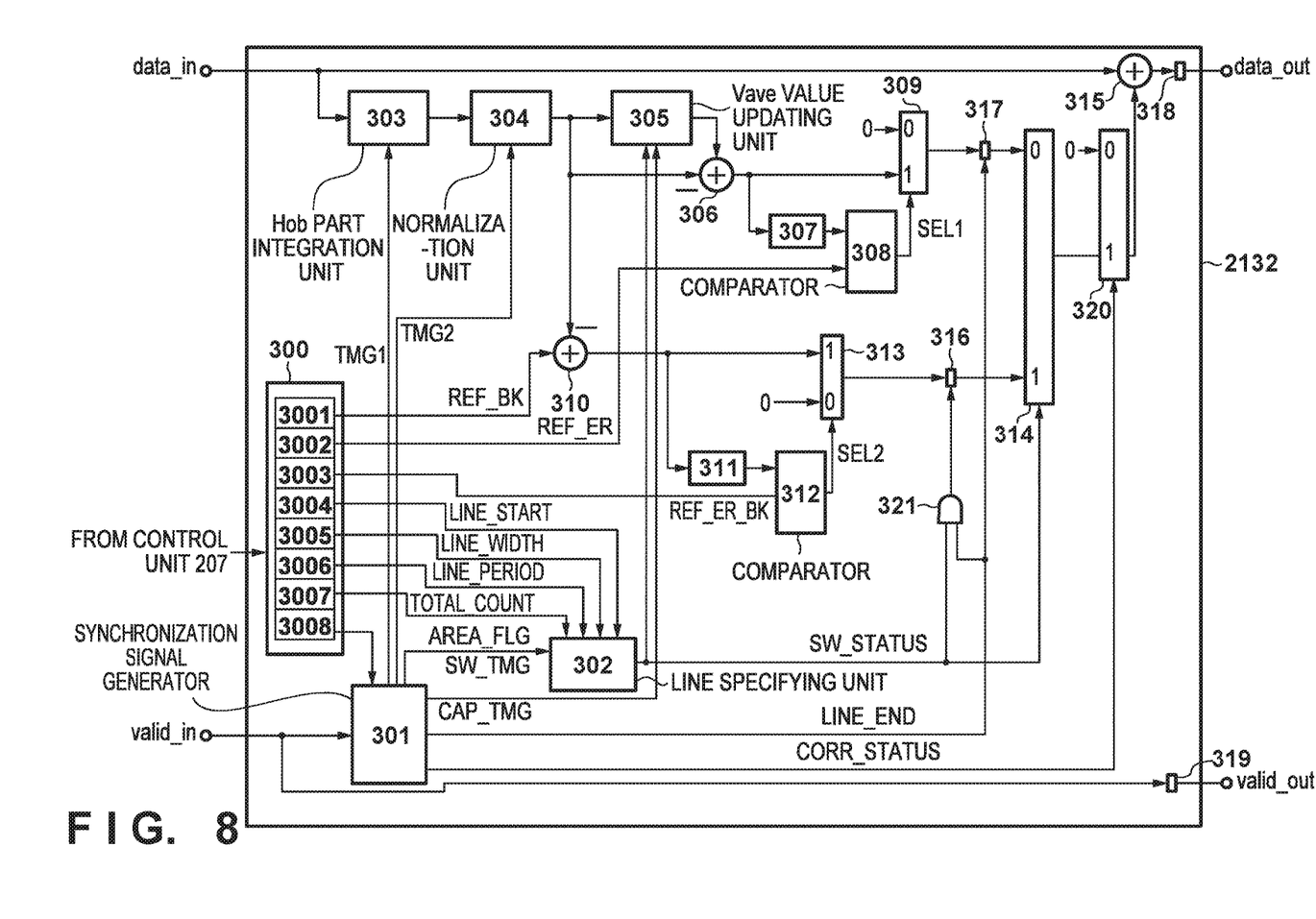
FIG. 8 is a block diagram showing a configuration of a horizontal band correction unit according to the embodiment.
Figure 12:
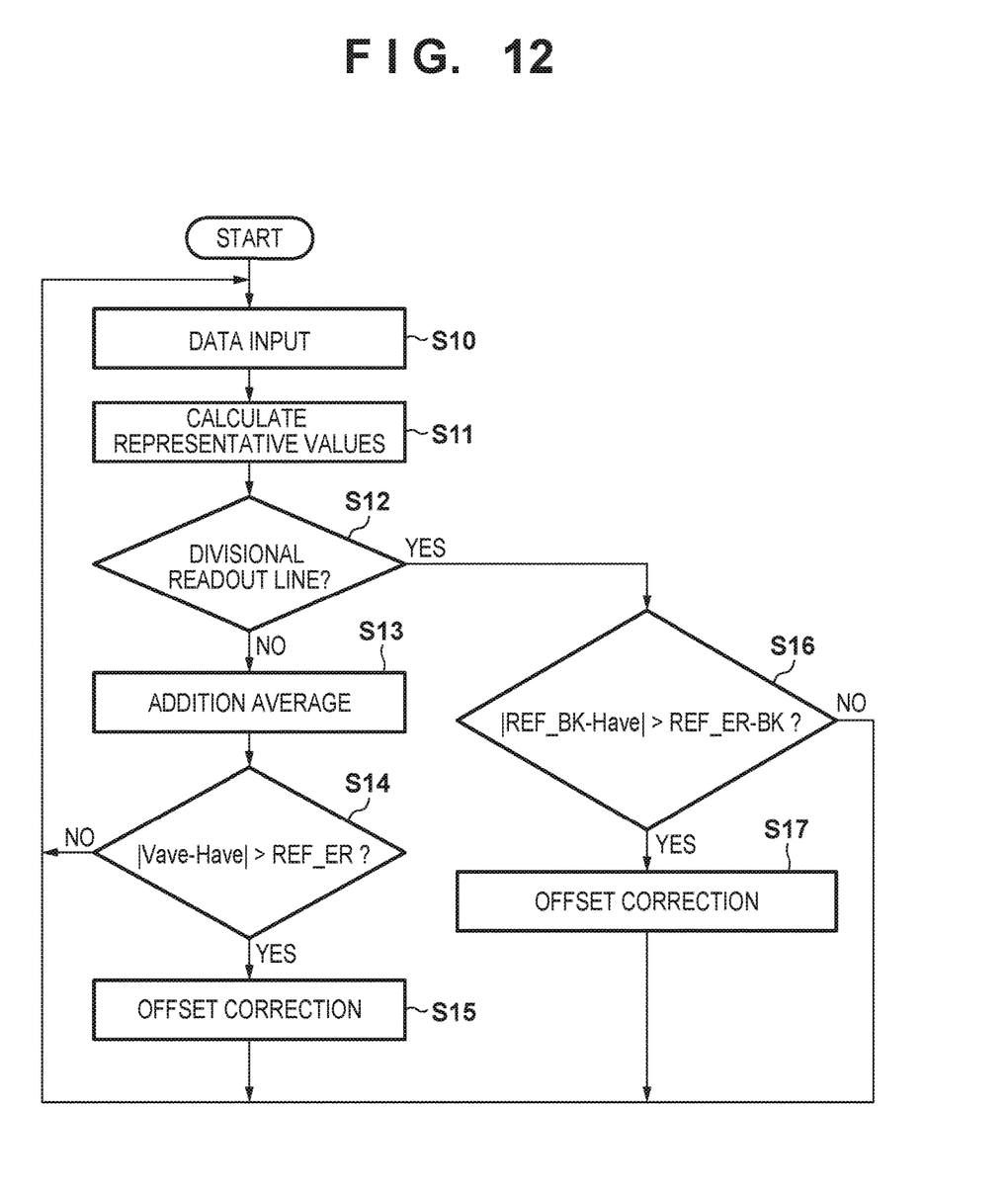
FIG. 12 is a flowchart of horizontal band correction processing according to the embodiment.

FIG. 8 is a block diagram showing the detailed configuration of the horizontal band correction unit 2132 according to this embodiment for realizing the above processing, and FIG. 12 is a flowchart of horizontal band correction processing.

The horizontal band correction unit 2132 receives image data (data_in) that underwent clamp processing performed by the digital clamp unit 2131 and a transfer data valid status signal (valid_in). Subsequently, after the processing, the image data (data_out) that underwent horizontal band correction and the transfer data valid status signal (valid_out) are transmitted. Even in the case when burst transfer of the image data is not guaranteed for clock-synchronized data transfer, the transfer data valid status signal (valid_out) has a role of enabling valid data to be appropriately selected by increasing or decreasing the signal level.

Figure 11:
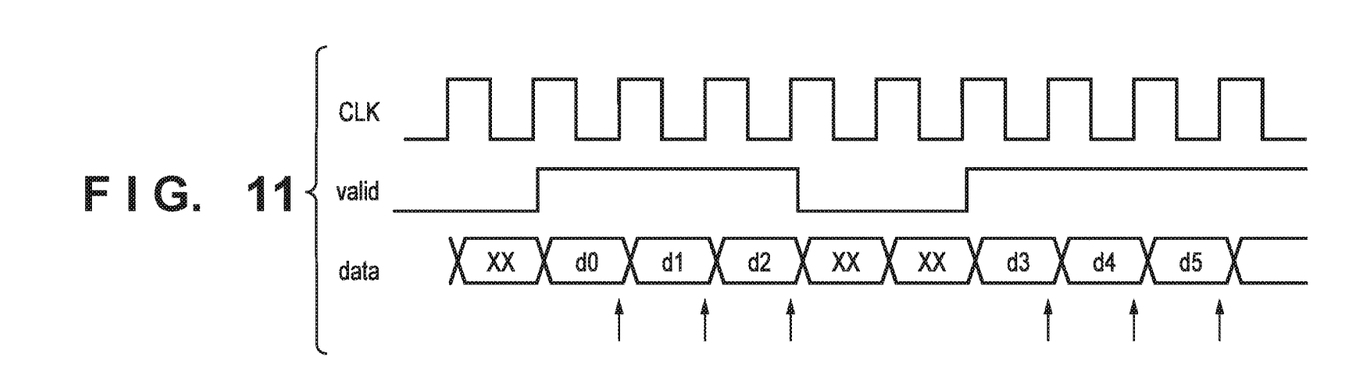
FIG. 11 is a timing chart showing a relationship between a clock (CLK) during clock synchronized transfer, a transfer data valid status signal (valid), and transferred image data (data)

Here, the relationship between a clock (CLK) during clock synchronized transfer, the transfer data valid status signal (valid) and image data to be transferred (data) will be described with reference to FIG. 11. The relationship between the status signal (valid_in) and the image data (data_in) and the relationship between the status signal (valid_out) and the image data (data_out) are equivalent to the relationship between the status (valid) and the image data (data) including CLK in FIG. 11. The image data (data) that is transferred when the transfer data valid status signal is H is the target of processing. FIG. 11 shows the valid states of pieces of data {d0, d1, d2, d3, d4 and d5}. The processing circuits in FIG. 7 find out the coordinate position during frame processing by counting the number of H states in the transfer data valid status signal for each clock. The transfer data valid status signal is added for data transfer between the modules downstream of the CDS/AGC circuit 202 in FIG. 6.

Referring to FIG. 8 again, a register unit 300 holds a parameter that is set by the control unit 207 before frame processing. The register unit 300 is equipped with a register 3001 that stores the black reference value (REF_BK), a register 3002 that stores the threshold value (REF_ER), and a register 3003 that stores the threshold value (REF_ER_BK). In addition, registers 3004 to 3007 of the register unit 300 are registers that store data for determining divisional readout lines 403. The register 3004 stores the position of the divisional readout line 403 that is the first in the processing frame 400 shown in FIG. 9 (LINE_START), and the register 3005 stores the number of consecutive divisional readout lines 403 (LINE_WIDTH). Moreover, the register 3006 stores the interval between the divisional readout lines 403 (LINE_PERIOD), and the register 3007 stores the number of the divisional readout lines 403 that were set in one frame (TOTAL_COUNT).

A synchronization signal generator 301 is equipped with a counter circuit for keeping track of the processing position in frame processing, receives the data valid status signal (valid_in), and generates a processing timing signal. The synchronization signal generator 301 also performs extraction of a line in the processing frame 400, keeps track of the detection area 401 and the correction area 402 within the processing frame 400, manages movement of the smoothing area 405 in the vertical direction, and performs data delay adjustment in the circuit. Note that the register unit 300 is provided with a register 3008 for setting frame definitions (e.g., horizontal size, vertical size, detection area position, and correction area position) of the synchronization signal generator 301.

A line specifying unit 302 specifies a position in the vertical direction of the divisional readout line 403, and receives an area flag (AREA_FLG) and line switching timings (SW_TMG) from the synchronization signal generator 301. The line specifying unit 302 counts the number of received line switching timings (SW_TMG), collates the counted number with each register value, and determines whether to perform processing on the divisional readout line 403 or another line, that is, a row read out by addition readout. If the area flag (AREA_FLG) is referred to and is determined to be a detection area, a switching status signal (SW_STATUS) indicating a determination result as a divisional readout is generated. The switching status signal (SW_STATUS) is then transferred to a Vave value updating unit 305, and in the case of the divisional readout line 403, update of the Vave value by a signal (CAP_TMG) (to be described later) is cancelled, and the switching status signal (SW_STATUS) is used for switching offset correction value output in a selector 314. In addition, correction value output of a register 316 constituted by a flip flop circuit is updated using the result of an AND operation with a detection end timing (LINE_END) in the line, which will be described later.

A Hob part integration unit 303 integrates the image data of the OB line of interest 407 at timings (TMG1) instructed by the synchronization signal generator 301. At every timing (TMG2) instructed by the synchronization signal generator 301, a normalization unit 304 divides the integrated image data by the integration count. In the case of not using a divider, the division is realized by bit shift processing for dividing the image data by a close power of two. A pseudo-divider realized by a multiplier and a bit shift circuit may also be used. The output of the normalization unit 304 obtained in this manner serves as a Have value, which is a representative value (step S11).

The Vave value updating unit 305 obtains a Vave value, namely, an average value of Have values for a plurality of lines in the vertical direction. In the case when the input image data does not correspond to the division readout OB line 406 (NO in step S12), the value of the normalization unit 304 is taken in at a timing (CAP_TMG) instructed by the synchronization signal generator 301. A Vave value, namely, an addition average value obtained by adding the value of the normalization unit 304 to Have values of a plurality of lines that have been stored so far is then acquired (step S13). Note that, it is preferred to use a shift register configuration such that the Have values of a plurality of lines are switched every time line processing is performed. In the case when the input image data corresponds to the division readout OB line 406 (YES in step S12), the Have values are prevented from being taken in from the normalization unit 304, in accordance with an instruction (SW_STATUS) of the line specifying unit 302. Note that, in the Vave value updating unit 305, Have values of the number of rows included in the smoothing area 405 are stored, and a Vave value is acquired.

A selector 309 receives a selection signal (SEL1) from a comparator 308, outputs an output value of an adder 306 as an offset correction value in the case when the selection signal (SEL1) is 1, and outputs a fixed value 0 as the offset correction value in the case when the selection signal (SEL1) is 0. Note that gain adjustment and offset adjustment may be performed on the offset correction value as described above. In addition, any fixed value may be used as a black level compensation value instead of the fixed value 0.

A register 317 is constituted by a flip flop circuit, and holds the output of the selector 309. The value of the register 317 is updated at a detection area end timing (LINE_END) for each line transmitted from the synchronization signal generator 301.

On the other hand, an adder 310 performs the calculation of (REF_BK−Have), and an absolute value acquisition unit 311 outputs the absolute value of the output of the adder 310. A comparator 312 compares the absolute value and the threshold value (REF_ER_BK) stored in the register 3003 (step S16). The comparator 312 outputs 1 in the case when the deviation between the black reference value (REF_BK) and the Have value in the OB line of interest 407 is greater than the threshold value (REF_ER_BK), and outputs 0 in the case when the deviation is less than or equal to the threshold value, as a selection signal (SEL2).

A selector 313 selects an offset correction value of the divisional readout lines 403, and receives the selection signal (SEL2) from the comparator 312. In the case when the state of the selection signal (SEL2) is a value of 1, the output value of the adder 310 is selected as the offset correction and is output, and, in the case when the state of the selection signal (SEL2) is a value of 0, a fixed value 0 is output as the offset correction value. Note that gain adjustment and offset adjustment may be performed on the offset correction value as described above. In addition, any fixed value may be used as the black level compensation value instead of the fixed value 0.

The register 316 is constituted by a flip flop circuit, and holds the output of the selector 313. The value of the register 316 is updated based on the result of an AND operation of a status signal (SW_STATUS) of a specific line (the divisional readout line 403) transmitted from the line specifying unit 302 and the detection area end timing (LINE_END) for each line from the synchronization signal generator 301, the AND operation being performed by an AND circuit 321.

The selector 314 switches the offset correction value between the divisional readout line 403 and the other lines. The switching status signal (SW_STATUS) is transmitted from the line specifying unit 302 to the selector 314. The line specifying unit 302 outputs 1 as the switching status signal (SW_STATUS) in the case of the divisional readout line 403, and outputs 0 in the case of the other lines. The selector 314 outputs the offset correction value held in the register 316 in the case when the switching status signal (SW_STATUS) is 1, and outputs the offset correction value held in the register 317 in the case of 0, as the offset correction value for the line of interest 404. A selector 320 is a selector for sending a correction value for the input data (data_in) of the correction area upon receiving a correction area status signal (CORR_STATUS) from the synchronization signal generator 301. If the status signal (CORR_STATUS) is a value of 1, the output value of the selector 314 is output, and if the status signal (CORR_STATUS) is a value of 0, correction value=0 (Zero) is output. In the case when the output is 0, the input data (data_in) becomes output data (data_out) without any change.

An adder 315 performs offset correction on the input data (data_in) (steps S15 and S17). An offset value takes a positive or a negative value, and offset adjustment by addition or subtraction is performed in the adder 315. A register 318 is constituted by a flip-flop, and realizes in-phase transfer using clock synchronization shown in FIG. 11. A register 319 is provided for performing phase difference adjustment on the transfer data valid status. The register 319 is constituted by a flip-flop similarly, and adjusts the phase of valid_out output so as to cope with an effect of insertion of the register 318 into a data path (so as to match the delay amount). The registers 318 and 319 are updated for each clock (not illustrated).

As described above, according to this embodiment, in the case when readout is performed by selective driving control, the influence of the addition signals obtained by division readout on horizontal band correction can be suppressed, and the signal level difference of the addition signals obtained by division readout can be suppressed.

Other Embodiments

Note that the present invention may be applied to a system constituted by a plurality of devices or may be applied to an apparatus including one device.

The embodiment of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for processing signals read out from an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the image processing apparatus comprising:
    a first processing unit configured to perform offset correction on signals of a first row read out by the first reading method, using signals in a predetermined number of rows that were read out by the first reading method before the first row, the predetermined number being two or more; and
    a second processing unit configured to perform offset correction on signals of a second row read out by the second reading method, using the signals of the second row and a predetermined value.

2. The image processing apparatus according to claim 1, wherein the first processing unit performs, in a case when the rows that were read out before the signals of the first row include a second row, the offset correction using signals of the predetermined number of rows excluding the second row.

3. The image processing apparatus according to claim 1, further comprising a determination unit configured to determine whether or not signals read out from the image sensor are signals of (i) a row read out by the first reading method, or (ii) signals of a row read out by the second reading method,
    wherein the first processing unit and the second processing unit perform processing based on a determination result of the determination unit.

4. The image processing apparatus according to claim 1, wherein the image sensor includes an area in which the photoelectric conversion portions receive incident light, and a light-shielded area that is shielded from the incident light, and
    the first processing unit performs the offset correction using signals of the first row and the predetermined number of rows read out from the photoelectric conversion portions in the light-shielded area.

5. The image processing apparatus according to claim 4, wherein
    the first processing unit acquires a representative value of signals read out from the photoelectric conversion portions in the light-shielded area for each of the predetermined number of rows and the first row, and, in a case when a difference between an average value of the acquired representative values of the predetermined number of rows and the representative value of the first row is greater than a predetermined threshold value, performs the offset correction.

6. The image processing apparatus according to claim 4, wherein the second processing unit performs the offset correction using signals of the second row read out from the photoelectric conversion portions in the light-shielded area.

7. The image processing apparatus according to claim 6, wherein the second processing unit acquires a representative value of the signals read out from the photoelectric conversion portions in the light-shielded area in the second row, and, in a case when a difference between the acquired representative value and a predetermined reference value is greater than a predetermined threshold value, performs the offset correction.

8. An image capturing apparatus comprising:
    an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions;
    a first processing unit configured to perform offset correction on signals of a first row read out from the image sensor by the first reading method, using signals in a predetermined number of rows that were read out by the first reading method before the first row, the predetermined number being two or more; and
    a second processing unit configured to perform offset correction on signals of a second row read out from the image sensor by the second reading method, using the signals of the second row and a predetermined value.

9. An image processing method for processing signals read out from an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the image processing method comprising:
    performing offset correction on signals of a first row read out by the first reading method, using signals in a predetermined number of rows that were read out by the first reading method before the first row, the predetermined number being two or more; and
    performing offset correction on signals of a second row read out by the second reading method, using the signals of the second row and a predetermined value.

10. The image processing method according to claim 9, further comprising determining whether or not signals read out from the image sensor are (i) signals of the first row or (ii) signals of the second row,
wherein the offset correction on signals of the first row is performed without using signals determined to be signals of the second row.

11. A non-transitory computer-readable storage medium that stores a program for causing a computer to function as units of an image processing apparatus having an image sensor that includes a plurality of photoelectric conversion portions for each of a plurality of micro-lenses that are two-dimensionally arranged, and can read out signals for each row selectively by either a first reading method in which signals from the plurality of photoelectric conversion portions are added and read out, or a second reading method for performing readout so as to acquire a pair of signals having a phase difference from the plurality of photoelectric conversion portions, the storage medium storing:
a first program code that causes the computer to perform offset correction on signals of a first row read out from the image sensor by the first reading method, using signals in a predetermined number of rows that were read out by the first reading method before the first row, the predetermined number being two or more; and
a second program code that causes the computer to perform offset correction on signals of a second row read out from the image sensor by the second reading method, using the signals of the second row and a predetermined value.

12. An imaging capturing apparatus comprising:
an image sensor that includes a plurality of photoelectric conversion portions for each of a plurality of micro-lenses that are two-dimensionally arranged, and can read out signals by either a first reading method, in which signals from the plurality of photoelectric conversion portions are added, or a second reading method for performing readout so as to acquire a pair of signals having a parallax from the plurality of photoelectric conversion portions;
a first processing unit configured to perform offset correction on signals of a first row read out from the image sensor by the first reading method, using signals that were read out by the first reading method; and
a second processing unit configured to perform offset correction on signals of a second row read out from the image sensor by the second reading method, using signals that were read out by the second reading method.

13. An image processing apparatus for processing signals read out from an image sensor that includes a plurality of photoelectric conversion portions for each of a plurality of micro-lenses that are two-dimensionally arranged, and can read out signals by either a first reading method, in which signals from the plurality of photoelectric conversion portions are added, or a second reading method for performing a readout so as to acquire a pair of signals having a parallax from the plurality of photoelectric conversion portions, the image processing apparatus comprising:
a first processing unit configured to perform offset correction on signals of a first row read out by the first reading method, by using signals in a predetermined number of rows that were read out by the first reading method before the first row, the predetermined number being two or more, wherein the first processing unit performs, in a case when the rows that were read out before the signals of the first row include a second row in which signals are read out by the second reading method, the offset correction using signals of the predetermined number of rows excluding the second row.

14. The image processing apparatus according to claim 13, further comprising a second processing unit configured to perform offset correction on signals of a second row read out by the second reading method, using the signals of the second row and a predetermined value.

* * * * *